Figure 1:
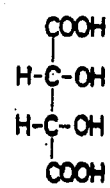
Figure 2:
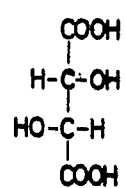
Figure 3:
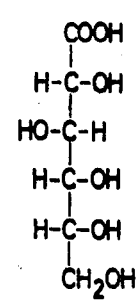
Figure 4:
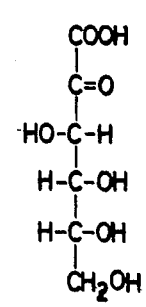
Figure 5:
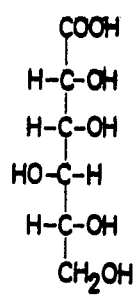
Figure 6:
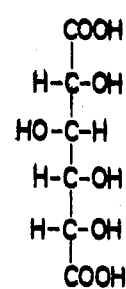
Figure 7:
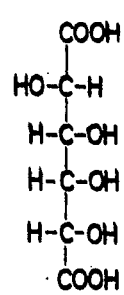
Figure 8:
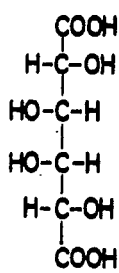
Figure 9:
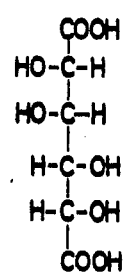
Figure 10:
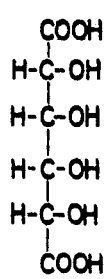

United States Patent [19]

Heesen

[11] 4,000,083

[45] Dec. 28, 1976

[54] SEQUESTERING AGENTS

[75] Inventor: Jan G. Heesen, Gorinchem, Netherlands

[73] Assignee: B°V° Chemie Combinatie Amsterdam C°C°A°, Gorinchem, Netherlands

[22] Filed: May 6, 1974

[21] Appl. No.: 467,309

[52] U.S. Cl. .............................. 252/135; 252/99; 252/102; 252/136; 252/174; 252/181; 252/DIG. 11
[51] Int. Cl.$^2$ ........................................ C11D 3/04
[58] Field of Search ..... 252/135, 136, 99, DIG. 11, 252/174, 181, 102

[56] References Cited

UNITED STATES PATENTS

| 3,696,044 | 10/1972 | Rutledge | 252/DIG. 11 |
| 3,704,320 | 11/1972 | Lannert | 252/135 |
| 3,755,181 | 8/1973 | Henricks | 252/135 X |

*Primary Examiner*—Mayer Weinblatt
*Attorney, Agent, or Firm*—Haseltine, Lake & Waters

[57] ABSTRACT

A sequestering agent containing a mixture of one or more organic compounds having a carboxylic acid or carboxylate group and at least vicinal hydroxy groups adjacent to the carboxyl moiety, and a compound selected from boric acid, borax and alkali metal borates, is described.

6 Claims, 10 Drawing Figures

SEQUESTERING AGENTS

The present invention relates to a process for the preparation of a sequestering agent containing a mixture of an organic compound containing a carboxylic or carboxylate group having at least two vicinal hydroxyl groups with boric acid and/or borates.

Such process has been described in the Dutch Pat. No. 99.202, in which a mixture of one or more organic compounds having at least two vicinal OH groups, preferably gluconic acid or an alkali gluconate and of boric acid and/or borates is used.

Further it is known from Industrial and Engineering Chemistry 45, (1953), 2782–4 that of the sugar acids glucaric acid has in alkaline medium a better sequestering action than gluconic acid.

However, it is also known from Journal of the American Oil Chemists' Society 48 (1971) 682-3 that the sodium salts of gluconic acid and glucaric acid, although they are good sequestering agents for calcium ions in a 2–4% solution of sodium hydroxide, have at a pH of 10 a sequestering action too low to be suitable for use in detergents.

In view of hygienic problems for the surroundings it is desirable to look for substitutes for polyphosphates in detergents, because such polyphosphates attribute to eutrofication, i.e. an extraordinary increase of the growth of water plants.

It was surprisingly found that the mixture of one or more hydroxy acids having at least one terminal carboxilic group and at least two vicinal hydroxy groups in a cis-position, one hydroxy group of which being present in $\alpha$-position to the carboxylic group, such as glucaric acid and/or mono- or dialkaline metal salts, ammonium salts or substituted ammonium salts thereof, with boric acid and/or borates and/or perborates appears to have considerably better properties in certain cases, hereafter to be elucidated, than similar mixtures of gluconic acid, gluconates and other sequestering agents.

It is true for example glucaric acid falls within the general definition of the organic compounds having at least two vicinal OH groups such as they are mentioned in the Dutch Pat. No. 99.202, but in there nothing is taught about the considerably better properties of the mixture of glucaric acid or glucarate and boric acid and/or borates, in comparison with the corresponding mixtures of gluconates with boric acid and/or borates. Further glucaric acid contains two carboxylic groups and gluconic acid only one carboxylic group.

Consequently the invention relates to a process for the preparation of sequestering agents, containing a mixture of an organic compound containing a carboxylic or carboxylate group, having at least two vicinal OH groups with boric acid and/or borates, which process is characterized by the use of one or more hydroxy acids having at least one terminal carboxylic group and at least two vicinal hydroxy groups in a cis-position, one hydroxy group of which being present in $\alpha$-position to the carboxylic group or at least one hydroxy group in $\alpha$-position in respect of one of the carboxylic groups, and/or mono- or dialkali metal salts, ammonium salts or substituted ammonium salts thereof, as the organic compound in combination with boric acid and/or borates and/or perborates.

In this connection hydroxy groups in a cis-position mean that the organic compound is drawn in a Fischer-projection formula with straight chain, the carboxylic group(s) being placed at the beginning and/or at the end and the two vicinal hydroxy groups being projected on the same side of the straight chain.

Examples of acids that meet this definition are the polyhydroxy monocarboxylic acids, such as erythronic acid, lyxonic acid, ribonic acid, allonic acid, mannonic acid, gulonic acid, talonic acid, glucuronic acid and mannuronic acid. However, polyhydroxy dicarboxylic acids are preferred, such as meso tartaric acid, ribaric acid, arabo saccharic acid, glucaric acid, talosaccharic acid, manno-saccharic acid and allosaccharic acid. If desired, the abovementioned acids may be applied as mono- or dilactone under alkaline conditions.

The Figures are representative of the compounds mentioned above.

The preparation of the mixture of the organic compound and the boric acid and/or borates may be carried out both before and in situ, in which case consequently the components are applied separately at the time of the sequestering activity is desired.

The invention relates as well to a process for the preparation of detergents, which process is characterized in that therein as sequestering agent one or more hydroxyacids having at least one terminal carboxylic group and at least two vicinal hydroxy groups in a cis-position, one hydroxy group of which being present in $\alpha$-position to the carboxylic group or at least one hydroxylic group in $\alpha$-position in respect to one of the carboxylic groups, and/or the mono- or dialkali metal salts, ammonium salts or substituted ammonium salts thereof are used in combination with boric acid and/or borates and/or perborates.

The capacity of alkali metal salts of glucaric acid and mixtures thereof with compounds containing borium to form water-soluble complexes with calcium, magnesium and zinc has been determined at a pH of at least 7 and compared with that of sodium gluconate, its mixtures with boron containing compounds and of some other known sequestering agents.

The capacity to sequester calcium ions has been determined by means of titrations with oxalate as an indicator. (see Industrial and Engineering Chemistry 45, 1953, 2782–2784). In this determination 25 cm$^3$ of the sequestering agent solution in distilled water (concentration 8 g/l), containing 0.01 g of sodium oxalate, are brought at the desired pH with sodium hydroxide and thereafter are slowly (1 cm$^3$ per 5 minutes) titrated with a calcium acetate solution (concentration 10 g/l) till a slight turbidity is formed. During the titration the pH is maintained constant by the addition of a 0,5 N NaOH-solution. The sequestering capacity is defined as the amount of g sequestered metal ions per 100 g (anhydrous) sequestering agent.

The capacity to sequester magnesium ions is determined by the addition of increasing amounts of a magnesium chloride solution (MgCl$_2$.6H$_2$O; concentration 50 g/l) to 25 cm$^3$ of a sequestering agent solution in distilled water (concentration 8 g/l), the mixtures being adjusted to the desired pH by means of a 0.5N NaOH-solution. The sequetering capacity is defined as the largest amount of magnesium (in g per 100 g of sequestering agent) that can be added without formation of a turbidity or precipitate after 30 minutes at 90° C.

The capacity to sequester zinc ions is determined by adjusting 25 cm$^3$ of a sequestering agent solution (concentration 8 g/l) with sodium hydroxide to the desired pH and thereafter slowly (1 cm$^3$ per 5 minutes) titrating with a solution of zinc chloride (concentration 10 g/l) till a slight turbidity is formed. The pH is maintained constant during the titration by the addition of a 0.5N NaOH-solution. The sequestering capacity is defined as the amount of g of sequestered metal ions per 100 g of sequestering agent.

The amount of the separate components of the sequestering agent may vary within wide limits. The degree in which the sequestering activity of e.g. glucaric acid is improved depends on the amount of boron compound. By applying 0.25 atom boron (as boric acid or sodium perborate) per mol glucaric acid the same sequestering action is obtained as of sodium citrate, which might be used, as substitute for polyphosphates in detergents. By the addition of 0.7 atom boron per mol glucaric acid the same good sequestering activity is obtained as with sodium tripolyphosphate. By the addition of more than 2 to 3 atoms boron per mol glucaric acid the sequestering capacity is only additionally improved to a slight degree in respect of 1 atom boron. Consequently it is appropriate to apply 0.25 – 3 atoms of boron per mol of glucaric acid, preferably 1–2 atoms of boron per mol of glucaric acid.

Although the mechanism of the borate complex formation, bringing about the improved sequestering action, has not been explained, it is clear indeed that the sequestering capacity of the complex depends on the stereochemical configuration of the hydroxyl groups in the sugar acids. The improved sequestering action of the mixtures of glucaric acid and boron containing compounds (boroglucarate) in respect of the mixtures of gluconic acid and boron containing compounds (borogluconate) is anyhow not exclusively caused by the fact that glucaric acid (formula 6) contains twice as many carboxylic groups as gluconic acid (formula 3), as it is clear when comparing the sequestering capacity of disodium tartrate (table A). Tartaric acid (formula 1 and 2) contains twice as many carboxylic groups as gluconic acid and as many carboxylic groups as glucaric acid.

In the results mentioned in table B the obviously slighter action of mucic acid (formula 8), compared with the isomeric glucaric acid is striking. Further the better sequestering action of mesotartaric acid (formula 1) in respect of L(+) tartaric acid (formula 2) and of gulonic acid (formula 5) in respect of gluconic acid (formula 3) are clear from the results of table C.

Consequently the configuration of the hydroxy groups is of essential importance for a greatest possible improvement of the sequestering action of saccharic acids by the formation of the boron complexes.

It appears according to table D that the sequestering action of sodium-2-ketogluconate (2-ketogluconic acid = formula 4) hardly increases by the addition of boron compounds, from which it is clear that a hydroxy group must be present in α-position to the carboxylic group.

Of the polyhydroxydicarboxylic acids having 6 C-atoms talosaccharic acid (formula 7), mannosaccharic acid (formula 9) and allosaccharic acid (formula 10) have also an excellent sequestering action for metal ions.

The mixtures according to the invention can be used anywhere where the sequestering of ions is required. Some examples thereof are the softening of water, the solution of decompositions of lactic stone and the like and in particular in synthetic detergents as substitute for the usual sequestering agents.

EXAMPLE I

The influence of the addition of boron, in the form of boric acid ($H_3BO_3$) or sodium perborate (Na $BO_3$.4-$H_2O$) to alkali metal salts of glucaric acid, gluconic acid, tartaric acid and citric acid on the ability of sequestering calcium ions was controlled. The measurements carried out in the way described above were made at a pH of 9.5.

Table A

| Amount of atoms of boron per mol sequestering agent | 0 | 0.25 | 0.50 | 1.00 |
|---|---|---|---|---|
| Sequestering agent: | | | | |
| potassium sodium glucarate (+ boric acid) | 1.8 | 5.8 | 10.5 | 15.4 |
| potassium sodium glucarate (+ sodium perborate) | 1.8 | 6.6 | 11.3 | 14.9 |
| sodium gluconate (+ boric acid) | 0.5 | 2.7 | 5.4 | 6.5 |
| L(+) disodium tartrate (+ boric acid) | 2.0 | 3.3 | 6.8 | 8.8 |
| trisodium citrate (+ boric acid) | 5.5 | 6.0 | 5.6 | 5.2 |

EXAMPLE II

In this example the ability of sequestering calcium ions of boroglucarate at various pH's has been compared with that of borogluconate, boromucate, trisodium citrate, sodium nitrilotriacetate and sodium tripolyphosphate.

Table B.

| Sequestering agent | mol boric acid per mol sequestering agent | pH → 7 | 8 | 9.5 | 11 | 13 |
|---|---|---|---|---|---|---|
| disodium glucarate *) | 1 | 9.2 | 11.0 | 16.5 | 20.0 | 20.0 |
| potassium sodium glucarate | 1 | 9.0 | 10.8 | 15.4 | 19.8 | 19.7 |
| potassium sodium glucarate | 2 | 10.6 | 13.5 | 34.7 | 23.5 | 21.1 |
| disodium mucate | 1 | 1.5 | 5.6 | 14.0 | 13.8 | 5.3 |
| disodium mucate | 2 | 2.1 | 6.0 | 18.7 | 11.7 | 9.3 |
| sodium gluconate | 1 | 3.7 | 5.7 | 6.5 | 6.8 | 7.4 |
| trisodium citrate | — | 0.9 | 3.6 | 5.5 | 6.2 | 6.7 |
| sodium nitrilotriacetate | — | 10.2 | 15.2 | 16.2 | 17.1 | 16.8 |
| sodium tripolyphosphate | — | 9.6 | 11.3 | 12.3 | 12.1 | 8.8 |

*) prepared from glucaric acid dilactone + NaOH.

EXAMPLE III

In this example the influence of the presence of two vicinal hydroxy groups in cis-position, at least one of which being present in α-position to a carboxylic group on the sequestering of calcium at the boron addition at various pH's is demonstrated according to two sets of isomeric hydroxy acids.

Table C

| pH → | 7 | 8 | 9.5 | | | 11 | 13 |
|---|---|---|---|---|---|---|---|
| Amount of atoms of boron per mol sequestering agent | 1.0 | 1.0 | 0 | 0.25 | 0.5 | 1.0 | 1.0 | 1.0 |
| Sequestering agent | | | | | | | | |
| Meso-tartaric acid; disodium salt | 4.0 | 4.2 | 2.5 | 5.8 | 8.6 | 12.9 | 12.9 | (7.5?) |
| L - (+)-tartaric acid disodium salt | 3.3 | 3.7 | 2.0 | 3.3 | 6.8 | 8.8 | 8.2 | 10.6 |
| Sodium/gulonate [1] | 6.7 | 7.1 | 2.9 | 4.4 | 6.8 | 7.5 | 9.3 | 12.9 |
| Sodium/gluconate [1] | 3.3–3.4 | 5.0–5.4 | 1.4 | 3.0 | 5.2 | 6.6–6.4 | 7.2–6.7 | 7.9–7.6 |

[1] Starting/materials: L - gulonic acid γ-lactone and D-gluconic acid-δ-lactone; concentration sequestering agent solution 0.8 g/l; 0.005 g sodium/oxalate; concentration calciumacetate solution 1 g/l.

EXAMPLE IV

In this example the influence of the boron addition at various pH's on the sequestering of calcium by gluconic acid and 2-ketogluconic acid is elucidated.

Table D.

| pH | 9.5 | | 11 | | 12 | | 13 | |
|---|---|---|---|---|---|---|---|---|
| Amount of atoms boron per mol sequestering agent: | 0 | 1 | 0 | 1 | 0 | 1 | 0 | 1 |
| Sequestering agent | | | | | | | | |
| Sodium-2-ketogluconate | 0.9 | 1.2 | 1.0 | 1.5 | 20.6 | 21.8 | 27.6 | 31.4 |
| Sodium/gluconate | 0.5–1.4 | 6.5 | 0.9 | 6.9 | 2.0 | 7.2 | 4.5 | 7.6 |

EXAMPLE V

The sequestering capacity for magnesium ions, determined in the way described above, of the sequestering agent according to the invention is compared with that of the known sequestering agents boro gluconate, the trisodium salt of nitrilotriacetic acid and sodium tripolyphosphate.

The results have been summarized in table E.

Table E.

| pH → | 9 | 10 |
|---|---|---|
| Sequestering agent | | |
| Potassium sodium glucarate (+ 1 mol boric acid per mol) | 31 | 23.5 |
| Sodium gluconate (+ 1 mol boric acid per mol) | 22 | 9.5 |
| Nitrilo triacetic acid tri-sodium salt | 12 | 10 |
| Sodium tripolyphosphate | 8 | 8 |

It is clear from the results that the sequestering capacity of boro glucarate is very good.

EXAMPLE VI

The sequestering capacity for zinc ions, determined in the way described above, of a sequestering agent according to the invention is compared with that of the boro gluconate. The results have been summarized in table F.

Table F.

| pH → | 8 | 9.5 | 11 |
|---|---|---|---|
| Sequestering agent | | | |
| Potassium sodium glucarate (+ 1 mol boric acid per mol) | 57.7 | 53.0 | 15.3 |
| Sodium gluconate (+ 1 mol boric acid per mol) | 28.4 | 14.6 | 3.5 |

It is clear from the results that the zinc-sequestering capacity of the boroglucarate is considerably greater than that of borogluconate, which for instance may be of importance in the electrolytical zinc plating in baths free from cyanide.

EXAMPLE VII

The sequestering capacity of boroglucarate and borogluconate in the presence of some possible detergent components and in particular of alkaline waterglass ($Na_2O.2SiO_2$) has been determined in the way described hereafter.

The fact is that silicate is the most important component of synthetic detergents that causes precipitation in hard water in the absence of phosphates.

The presence of silicate is practically always necessary on the following grounds:

a. Silicate acts as a corrosion inhibitor for many metals that are used in washing machines.

b. Silicate prevents the decomposition of perborate, in which ions of heavy metals have a catalytic effect; yellowing of the laundry by small amounts of iron salts in the water is also prevented by the formation of uncoloured ironsilicate complexes.

c. Silicate has a dirt suspending power in respect of inorganic dirt particles.

d. Silicate renders the manufature of a "free flowing", not clotting or baking together pulverous detergent or one that consists of hollow pearls less difficult.

The following preparations were prepared (concentrations in grams per liter):

| Components | a | b | c | d | e |
|---|---|---|---|---|---|
| potassium hydrogen glucarate[1] | 5 | 5 | 1.25 | — | — |

-continued

| Components | a | b | c | d | e |
|---|---|---|---|---|---|
| sodium gluconate | — | — | — | 1.14 | — |
| sodium tripolyphosphate | — | — | — | — | 2.0 |
| borax (Na₂B₄O₇.10H₂O) | 2.26 | 1.30[1] | 0.57 | 0.50 | — |
| alkaline waterglass (100%) | 0.30 | 0.30 | 0.30 | 0.30 | 0.28 |
| sundries | — | 2.40[2] | — | — | — |

[1]With preparation c the concentrations of glucarate and borax were decreased to ¼ of the original amount; for with the high concentrations it was very difficult to determine visually whether or not slight precipitations were formed.

[2]With this preparation still a number of other possible detergent components are added, viz.:
- 0.30 g  linear alkylbenzenesulfonate (as 100%);
- 0.30 g  nonionic synthetic detergent: iso-octylfenol, condensed with average 11 epoxyethane groups per molecule (as 100%);
- 0.50 g  sodium sulfate (as anhydrous);
- 0.50 g  sodium CMC (as 100%);
- 1.25 g  sodium perborate (NaBO₃.4H₂O);
- 0.01 g  EDTA (as 100%).

1. With preparation c the concentrations of glucarate and borax were decreased to 1/4 of the original amount; for with the high concentrations it was very difficult to determine visually whether or not slight precipitations were formed.

2. With this preparation still a number of other possible detergent components are added, viz.: 0,30 g linear alkylbenzenesulfonate (as 100%); 0,30 g nonionic synthetic detergent: iso-octylfenol, condensed with average 11 epoxyethane groups per molecule (as 100%); 0,50 g sodium sulfate (as anhydrous); 0,05 g sodium CMC (as 100%); 1,25 g sodium perborate (NaBO₃.4H₂O); 0,01 g EDTA (as 100%).

The total amount of borates (borax + sodium perborate) per mol sequestering agent corresponds to the amount of borax in the preparations a and c.

The determinations have been carried out at a pH of 9 and 10.

As sequestering capacity the highest hardness value in me (milli-equivalent) per gram is given, at which no precipitate was formed in the solution after one hour at 90° C.

The potassium hydrogen glucarate was dissolved in an excess 2 N NaOH; the other components were dissolved in the usual way in distilled water in the indicated amounts.

The results have been summarized in table G:

Table G.

| Preparation | Sequestering capacity in me/g at 90° C. | | | | |
|---|---|---|---|---|---|
| | | a | b | c | d |
| calcium hardness | —pH 9 | — | — | >20 | >20 |
| | —pH 10 | — | — | 9.8 | 4.5 |
| calcium + magnesium (mol. ratio Ca⁺⁺ : Mg⁺⁺ = 7.4 : 1) | | | | | |
| hardness | —pH 9 | 5.5 | 6.8 | 5.4 | 2.0 |
| | —pH 10[3] | 3.7 | 4.3 | 8.0 | 2.0 |

[3]See remark 1 at the preparations.

For preparation e, sodium tripolyphosphate, at pH 10 a sequestering capacity for calcium and magnesium ions was measured of 3.9 me/g and 6.2 me/g respectively.

Under these experimental conditions too it appears that glucarate sequesters very well calcium and magnesium ions in the presence of borates.

I claim:

1. A sequestering agent, consisting of a mixture of one or more organic compounds, each containing from 4 to 6 carbon atoms, one or two terminal carboxylic acid or alkali metal carboxylate groups and having at least two vicinal hydroxy groups, and one or more of a boron compound selected from the group consisting of boric acid, borax and alkali metal perborates, wherein said organic compound has at least two vicinal hydroxy groups in the cis- position, one hydroxy group being in the α-position to said carboxylic acid or alkali metal carboxylate group, and the ratio of boron to said organic compound is in the range of from 0.25–3.0:1.

2. A sequestering agent according to claim 1 consisting of a mixture of one or more organic compounds, each containing from 4 to 6 carbon atoms, one or two terminal carboxylic acid or alkali metal carboxylate groups and having at least two vicinal hydroxy groups, and one or more of a boron compound selected from the group consisting of boric acid, borax and alkali metal perborates, wherein said organic compound has at least two vicinal hydroxy groups in the cis- position, one hydroxy group being in the α-position to said carboxylic acid or alkali metal carboxylate group.

3. A sequestering agent according to claim 2 wherein the ratio of boron to organic compound is 1–2:1.

4. A sequestering agent according to claim 2, wherein said organic compound is selected from the group consisting of glucaric acid and its alkali metal salt.

5. A sequestering agent according to claim 4, wherein said organic compound is selected from the group consisting of potassium hydrogen glucarate and glucaric acid lactone.

6. The use of a sequestering agent consisting of a mixture of one or more organic compounds, each containing from 4 to 6 carbon atoms, one or two terminal carboxylic acid or alkali metal carboxylate groups and having at least two vicinal hydroxy groups, and one or more of a boron compound selected from the group consisting of boric acid, borax and alkali metal perborates, wherein said organic compound has at least two vicinal hydroxy groups in the cis- position, one hydroxy group being in the α-position to said carboxylic acid or alkali metal carboxylate group, and the ratio of boron to said organic compound is in the range of from 0.25–3.0:1, in a detergent composition consisting essentially of said sequestering agent, a linear alkylbenzene sulfonate, a nonionic synthetic detergent, sodium sulfate, sodium carboxymethyl cellulose and ethylene diamine tetraacetic acid.

* * * * *